Patented Apr. 13, 1937

2,076,596

UNITED STATES PATENT OFFICE 2,076,596

PREPARATION OF CELLULOSE XANTHATE SOLUTIONS

George A. Richter, Berlin, N. H., assignor to Brown Company, Berlin, N. H., a corporation of Maine No Drawing. Application August 20, 1935, Serial No. 37,043

5 Claims. (Cl. 260—100)

This invention relates to the preparation of cellulose xanthate solutions or viscose syrups such as are used in various industries, including the manufacture of viscose silk so-called and pellicles of regenerated cellulose sometimes termed "cellophane", the sizing or coating of papers and textile fabrics, etc.

The usual practice of making cellulose xanthate solution or viscose syrup involves a number of steps, including those of sheeting the cellulose fiber used as raw material, of soaking the sheets in a mercerizing caustic soda solution, of squeezing the sheets free of excess solution, of disintegrating the sheets of soda cellulose into a fluffy mass, of ageing the mass or crumbs of soda cellulose, of xanthating the aged soda cellulose by reaction with carbon bisulphide vapor, and of dissolving the resulting xanthate in a dilute caustic soda solution to form the xanthate solution or viscose syrup. I have done considerable research and investigation with a view toward eliminating these various steps and in lieu thereof preparing the xanthate solution or viscose syrup by bringing together and reacting substantially to completion in a single vessel the various raw materials or ingredients theoretically required in the production of a xanthate solution or viscose syrup of usual strength and composition employed in the manufacture of artificial silk, pellicles of regenerated cellulose, and kindred products, that is, a solution or syrup of about 6% to 10% cellulose and caustic soda content each.

I have found that both the chemical and physical properties of the cellulose fiber employed as raw material figure importantly in the results secured in essentially a one-step xanthating reaction of the character hereinbefore described. Thus, by initially reducing the cellulose fiber employed as raw material to a pulverulent condition, preferably to a particle size of about 200 mesh or finer, it becomes possible to effect a substantially complete xanthating reaction thereupon with the appropriate amount of water, caustic soda, and carbon bisulphide to form a cellulose xanthate solution of the desired strength and composition, provided, however, that the various ingredients undergo intimate and substantially uniform or thorough mixing during the reaction. However, even with such fine particle size cellulose, it is sometimes difficult to avoid, when producing cellulose xanthate solutions of about 6% to 10% cellulose and caustic soda concentration each, such high viscosity in the solution being generated as interferes seriously with proper stirring or mixing of the ingredients and as frustrates the promotion of a progressive or smooth reaction to completion.

I have found that a highly important factor in the attainment of a cellulose xanthate solution or viscose syrup of about 6% to 10% cellulose and caustic soda concentration each by a one-step xanthating operation is the solution viscosity of the cellulose fiber employed as raw material and that this factor is to all practical intents and purposes a critical one in xanthating in such manner cellulose fiber of substantially original length, for instance, wood pulp fibers or other cellulose fibers of a length substantially as liberated or derived from the parent or raw cellulosic material. Thus, I have found that if the cellulose fiber used as raw material is the ordinary sulphite pulp or other ordinary cellulose fiber or chemical wood pulp, one cannot effect the desired substantially complete xanthating reaction thereupon by simply admixing therewith water, caustic soda, and liquid carbon bisulphide in proportions calculated to lead directly to a cellulose xanthate solution of about 6% to 10% cellulose and caustic soda content each, even though the reaction is carried out in a highly efficient mixing vessel, as the mixture of ingredients becomes so highly viscous after only a fraction of its reactable components have reacted to form cellulose xanthate as to militate against proper mixing or reaction of the remaining substantial fraction. On the other hand, I have found that if the cellulose fiber used as raw material has an appropriately low solution viscosity and more particularly a solution viscosity below 1, it not only becomes possible to effect the xanthation of such fiber in substantially unreduced condition in a single step, that is, without subjecting such fibers to subdivision or pulverization preparatory to xanthation. Aside from the higher reactivity of such low viscosity fiber to the xanthating reagents so that the xanthating reaction thereupon can be completed more quickly than otherwise, there is no tendency for the mixed ingredients entering into the xanthating reaction to become so viscous that, after only a portion of the reactable ingredients have reacted to form the xanthate, the remaining portion remains in unreacted state on account of the high viscosity of the incompletely reacted ingredients and the extreme difficulty of effecting contact between residual unreacted cellulose and the xanthating reagents. It is evidently the case that with high viscosity fiber, the mixing of the xanthating reagents therewith in amount calculated to produce a xanthate solution of about 6% to 10% cellulose and caustic soda each results in the development, long before all the cellulose has been xanthated, of sufficient highly viscous cellulose xanthate solution to envelop and protect the unreacted cellulose from access by the xanthating reagents, even though the reaction is carried out with the expenditure of considerable power in mixing equipment which would ordinarily be expected to expose fresh or unreacted cellulose surface to the unconsumed xanthating reagents so as to drive the xanthating reaction substantially to completion. Irrespective of what may be the actual mechanism to which is attributable the irregular and incomplete xanthation effected upon high viscosity cellulose fiber treated with xanthating reagents in amount designed to yield in a single step xanthate solutions of about 6% to 10% cellulose and caustic soda content each, it is a fact that xanthations performed under the same conditions upon cellulose fiber having a solution viscosity of less than 1 c. g. s. unit may be carried smoothly substantially to conclusion with the realization of xanthate solutions entirely satisfactory for the manufacture of viscose silk, pellicles of regenerated cellulose, or kindred end-products.

The cellulose fiber used as raw material in the process of the present invention may be derived from various sources. In the case of such more expensive end-products as artificial silk and films wherein such qualities as lightness of color, transparency, maximum luster, and strength, etc., are prized, the cellulose fiber is preferably one of high alpha cellulose content and whiteness, say, of an alpha cellulose content of about 93% to 98%. Since the ordinary chemical wood pulps are of a solution viscosity altogether too high for the purpose of the present invention, it is necessary, when wood pulps are employed, either to liberate them by special chemical processes productive of a fiber of the appropriately low solution viscosity or to subject the ordinary wood pulps to one or more after-treatments designed to develop therein the desired low solution viscosity. I have taken out a number of patents which disclose the production of cellulose fiber of low solution viscosity, such as can serve in the process of the present invention. Of the patents which relate to the liberation directly from raw cellulosic material, such as wood, of cellulose fiber of appropriately low solution viscosity, may be cited Patent No. 1,819,003, dated August 18, 1931, which describes the treatment of chipped wood or similar raw cellulosic material for a substantial period of time with hot dilute mineral acid solution, such as sulphuric, hydrochloric, and nitric, preparatory to fiber-liberating action thereupon with an alkaline liquor of a composition such, for instance, as is ordinarily used in the production of kraft pulp. Of the patents which deal with the after-treatment of chemical wood pulp and more particularly sulphite pulp to produce a product of the desired low solution viscosity, I may cite Patent No. 1,906,885, dated May 2, 1933, which describes the processing of such pulp in a mercerizing liquor containing, if desired, an oxidant, and then in a bleach liquor to produce a white cellulose fiber of high alpha cellulose content conformable to the solution viscosity requirements of the present invention. I might cite as additional illustrations the processes disclosed in Patents Nos. 1,923,641 and 1,935,129, dated August 23, 1933 and November 14, 1933, respectively, both of which are centered about modifying the solution viscosity of various kinds of cellulose fiber, including cotton as well as preliberated chemical wood pulp, to produce cellulose fiber products of a solution viscosity less than 1 and otherwise satisfactory for the purpose of the present invention. Having secured or prepared the desired special cellulose fiber of a solution viscosity preferably not greater than 1 and preferably, but not necessarily, possessed of an alpha cellulose content of at least about 93%, I mix it with caustic soda solution in amount calculated to yield a final mixture or xanthate solution of a caustic soda content of, say, 9%, based on the weight of the mixture of all ingredients, including pulp, caustic soda, water, and carbon bisulphide entering thereinto. In some instances, it is preferable to start the mixing or churning machine, which is preferably of high mixing efficiency and equipped with a jacket, with the caustic soda solution in amount and concentration calculated to yield a finished xanthate solution of appropriate causticity, for instance, one of 9% caustic soda content, based on the weight of the mixed reacting ingredients, and to pass water or other medium through the jacket of the machine so as to bring the caustic soda solution to a temperature of, say, 20° C. After this is done and while the machine is still in operation, the low solution viscosity pulp may be added to the solution as sheets or as shreds and in dry or moist condition in amount calculated to produce a final xanthate solution of, say, 9% cellulose content, that is, in the amount of 9%, based on the weight of all the ingredients to be reacted to produce the xanthate solution. The mixing or churning of the caustic soda solution and cellulose fiber may be continued at about 20° C. for about 30 to 60 minutes, at the end of which time a thick suspension of heavy creamy consistency is had. It is preferable that the thick suspension then be cooled to about 15° C. by circulating cooling water or other suitable medium through the mixer jacket. To the preferably cooled, thick cellulose fiber suspension is then added 35% to 40% of liquid carbon bisulphide, based on the dry weight of the cellulose fiber; and such addition is preferably made while the machine is idle so as to avoid sensible loss of the carbon bisulphide by evaporation. The mixer is then closed off completely from the atmosphere so as to avoid carbon bisulphide loss and its operation again started and mixing continued for a period of about 3 hours while its contents are preferably kept at about 15° C. When the mixer is opened at the end of this period, it is found that substantially all of the ingredients have reacted to form a cellulose xanthate solution or viscose syrup of a cellulose and caustic soda content of 9% each.

The viscose solution prepared as hereinbefore described may be diluted with water while still in the mixer to any desired concentration, for instance, to a cellulose and caustic soda content of, say, 7% each. A solution diluted to a concentration of, say, 7% cellulose and caustic soda each, is that usually desired in the manufacture of viscose silk and pellicles of regenerated cellulose, but it is obvious that more dilute solutions, such as may be desired for the sizing of papers and textiles may be prepared, since no difficulty whatever is had in diluting the solution originally prepared. Dilution of the solution is preferably effected by adding water thereto while in the mixer and while the mixer is operating with water running through its jacket so as to keep the solution as it is being diluted at a temperature of about 15° C. Only a few minutes is required to effect a substantially uniform dilution of the solution to the final desired concentration.

In those instances when ripening of the solution is desired, as when the solution is to serve in the manufacture of viscose silk or pellicles of regenerated cellulose, the solution, after being adjusted, if desired, with diluting water to a cellulose and caustic soda content of, say, 7% each, may be ripened while still in the mixer by passing a suitable heating medium, such as hot water, through the mixer jacket. Thus, the solution may be brought to a temperature of, say, about 125° F. by circulating hot water through the jacket while the mixer is in operation; and this temperature may be reached in, say, about 10 minutes and maintained for, say, about 1½ to 2 hours, at the end of which time the solution or syrup has the appropriate ripeness or maturity for spinning or casting purposes. Once the proper ripeness has been produced in the syrup, which condition can be ascertained by testing samples from the batch being ripened, the ripened batch may be quickly cooled in the mixer to a temperature of, say, about 15° C. or lower, at which temperature the desired degree of ripeness attained in the syrup may be substantially fixed or arrested and the syrup kept at such temperature without spoilage or gelling for the usual period of time to permit conversion into the silk, films or other ultimate products for which it is intended.

It is to be understood that the particular example of procedure hereinbefore given admits of variation. For instance, although I have described the xanthating reaction as being effected at about 15° C., it is possible to conduct such reaction at about 20° C. or even at higher temperature. I have cited a reacting temperature of about 15° C. for the reason that the xanthating reaction is promoted at such lower than room temperature, but it is undesirable to conduct the reaction at much lower than about 15° C. not only because of the expense of refrigeration but because, even with low viscosity cellulose fiber, such lowering of the temperature of reaction results in such high viscosity in the reacting ingredients as deters their most efficacious mixing and maximum smoothness and rate of reaction. In other words, taking into consideration the various factors, I have found that a temperature of about 15° C. is optimum for the xanthating reaction of the present invention conducted with low viscosity cellulose fiber and more particularly fiber having a solution viscosity less than 1. A reacting temperature of 15° C. is not only preferable to one of 20° C. or greater by reason of the substantial avoidance of carbon bisulphide vaporization and loss during its addition and by reason of the smoother and quicker reaction effected at such lower temperature without encountering unduly high viscosity of the reacting ingredients thereat, but further because there is less danger of causing gelling or spoilage of the xanthate solution thereat than when the reaction is effected at higher temperature, especially at temperatures greater than 20° C. with reacting ingredients in amount calculated to yield a comparatively concentrated xanthate solution, for instance, one of about 8% to 10% cellulose content. I wish to reiterate the fact that the one-step xanthating practice of the present invention is designed more especially for the purpose of yielding cellulose xanthate solutions from reacting mixtures of cellulose fiber, water, caustic soda, and liquid carbon bisulphide brought together in proportions calculated to yield directly a cellulose xanthate solution of a cellulose content and a caustic soda content each falling within the range of 6% to 10%, based on the weight of the solution or of all the ingredients entering into the reaction.

The solution usually employed as a standard for measuring the viscosity of cellulose pulp is a cuprammonium cellulose solution of prescribed cellulose concentration, the viscosity being determined by measuring the time of efflux of a definite volume of such solution under standard conditions, through an orifice of standard size. The solution viscosity of fiber is hereinbefore given in absolute c. g. s. units or poises, and is determined by measuring the viscosity of a solution of 6 grams of fiber in a cuprammonium solution composed of 225 cc. of 28% ammonia water containing 9 grams of cuprous oxide or so-called "copper hydrate" powder. This "copper hydrate" powder is in reality basic copper nitrate corresponding in composition to the formula $Cu(NO_3)_2.3Cu(OH)_2$. The c. g. s. unit is employed because it is definite, denoting a viscosity 100 times that of water at 20° C., wherefore, a cuprammonium cellulose solution of standard composition identifying a fiber as having a solution viscosity of 10 is 1000 times as viscous as water at 20° C. The method of determining or measuring solution viscosity of cellulose fiber used herein is that described by me in much greater detail in "Industrial and Engineering Chemistry", volume 23, page 136, 1931; and inasmuch as the description of my viscosity-testing method as given in that publication affords the particular criterion or test used herein, it is to be understood that my reference to such description is intended to incorporate such description as a part hereof.

I claim:—

1. In the production from substantially unreduced cellulose fiber of cellulose xanthate solution, that practice which comprises bringing together for reaction all at the same time cellulose fiber of a solution viscosity less than 1, water, caustic soda, and liquid carbon bisulphide in proportions calculated to yield directly a cellulose xanthate solution of a cellulose and caustic soda content each falling within the range of 6% to 10%, based on the weight of all the reacting ingredients, and mixing all of said ingredients while keeping them at a temperature of about 15° to about 20° C. for a sufficient period of time to cause them to react substantially to completion to yield cellulose xanthate solution of such cellulose and caustic soda content in a single mixing step.

2. In the production from substantially unreduced cellulose fibre of cellulose xanthate solution, that practice which comprises bringing together for reaction all at the same time cellulose fiber of a solution viscosity less than 1, water, caustic soda, and liquid carbon bisulphide in proportions calculated to yield directly a cellulose xanthate solution of a cellulose and caustic soda content each falling within the range of 6% to 10%, based on the weight of all the reacting ingredients, and mixing all of said ingredients for a sufficient period of time at a temperature of about 15° C. to cause them to react substantially to completion to yield cellulose xanthate solution of such cellulose and caustic soda content in a single mixing step.

3. In the production from substantially unreduced cellulose fiber of cellulose xanthate solution, that practice which comprises bringing together for reaction all at the same time cellulose fiber of a solution viscosity less than 1, water, caustic soda, and liquid carbon bisulphide in proportions calculated to yield directly a cellulose xanthate solution of a cellulose and caustic soda content each falling within the range of 6% to 10%, based on the weight of all the reacting ingredients, mixing all of said ingredients for a sufficient period of time to cause them to react substantially to completion to yield cellulose xanthate solution of such cellulose and caustic soda content in a single mixing step; and indirectly cooling the ingredients while they are undergoing mixing and reaction to maintain them at a temperature of about 15° C.

4. In the production from substantially unreduced cellulose fiber of cellulose xanthate solution whose cellulose and caustic soda content, based on the weight of the solution, each falls within the range of 6% to 10%, that practice which comprises initially substantially uniformly mixing cellulose fiber of a solution viscosity less than 1 and caustic soda solution in amounts calculated to lead to such cellulose xanthate solution, adding liquid carbon bisulphide to the resulting mixture in amount calculated to xanthate the cellulose fiber, and mixing said ingredients while they are kept confined from the atmosphere at a temperature of about 15° to about 20° C. for a sufficient period of time to cause them to react substantially to completion to yield cellulose xanthate solution of such cellulose and caustic soda content in a single mixing step.

5. In the production from substantially unreduced cellulose fiber of cellulose xanthate solution whose cellulose and caustic soda content, based on the weight of the solution, each falls within the range of 6% to 10%, that practice which comprises initially substantially uniformly mixing cellulose fiber of a solution viscosity less than 1 and caustic soda solution in amounts calculated to lead to such cellulose xanthate solution, cooling the resulting mixture to about 15° C., adding liquid carbon bisulphide to the cooled mixture in amount calculated to xanthate the cellulose fiber, mixing said ingredients while they are kept confined from the atmosphere for a sufficient period of time to cause them to react substantially to completion to yield cellulose xanthate solution of such cellulose and caustic soda content in a single mixing step, and indirectly cooling the ingredients while they are undergoing mixing and reaction to maintain them at a temperature of about 15° C.

GEORGE A. RICHTER.